US009734207B2

(12) United States Patent
Goeppinger et al.

(10) Patent No.: US 9,734,207 B2
(45) Date of Patent: Aug. 15, 2017

(54) ENTITY RESOLUTION TECHNIQUES AND SYSTEMS

(71) Applicant: Entelo, Inc., San Francisco, CA (US)

(72) Inventors: Cole W. Goeppinger, San Francisco, CA (US); James C. Hwang, Huntington Beach, CA (US); Ayumi A. Yu, San Francisco, CA (US); John H. McGrath, Jr., San Francisco, CA (US); Thomas B. Benner, Oakland, CA (US); Gilles Pirio, San Francisco, CA (US)

(73) Assignee: Entelo, Inc., San Francisco, CA (US)

( * ) Notice: Subject to any disclaimer, the term of this patent is extended or adjusted under 35 U.S.C. 154(b) by 0 days.

(21) Appl. No.: 14/981,064

(22) Filed: Dec. 28, 2015

(65) Prior Publication Data

US 2016/0110424 A1    Apr. 21, 2016

(51) Int. Cl.
G06F 17/30 (2006.01)
G06Q 10/10 (2012.01)
G06N 7/00 (2006.01)

(52) U.S. Cl.
CPC .. *G06F 17/30525* (2013.01); *G06F 17/30867* (2013.01); *G06N 7/005* (2013.01); *G06Q 10/1053* (2013.01)

(58) Field of Classification Search
CPC ........ G06F 17/30525; G06F 17/30867; G06N 7/005; G06Q 10/1053
See application file for complete search history.

(56) References Cited

U.S. PATENT DOCUMENTS

| 8,285,719 B1 * | 10/2012 | Long | G06N 7/005 707/737 |
| 8,719,179 B2 | 5/2014 | Bonmassar et al. | |
| 2004/0034652 A1 * | 2/2004 | Hofmann | G06F 17/30699 |
| 2006/0116894 A1 | 6/2006 | DiMarco | |

(Continued)

FOREIGN PATENT DOCUMENTS

WO    WO-2013165923 A1    11/2013

OTHER PUBLICATIONS

Bullhorn Reach. "How It Works," http://www.bullhornreach.com/reach/content/how-it-works. Copyright 2013. Accessed on Jun. 23, 2015. 2 pg.

(Continued)

*Primary Examiner* — Taelor Kim
(74) *Attorney, Agent, or Firm* — Goodwin Procter LLP

(57) ABSTRACT

Entity resolution techniques and systems are described. An entity resolution method may include estimating a joint probability of occurrence of a plurality of values of a respective plurality of descriptors of an entity. The plurality of descriptor values may be included in a first data set. The method may further include determining that the joint probability of occurrence of the plurality of descriptor values is less than a threshold probability, identifying a second data set including the same plurality of values of the same respective plurality of descriptors, and determining, based at least in part on the joint probability of occurrence of the plurality of descriptor values being less than the threshold probability and on the first and second data sets including the same plurality of descriptor values, that the first and second data sets describe the same entity.

25 Claims, 3 Drawing Sheets

(56) References Cited

U.S. PATENT DOCUMENTS

| | | |
|---|---|---|
| 2009/0164641 A1 | 6/2009 | Rogers et al. |
| 2009/0248685 A1 | 10/2009 | Pasqualoni et al. |
| 2010/0287111 A1 | 11/2010 | Scarborough et al. |
| 2011/0022530 A1 | 1/2011 | Bogle et al. |
| 2011/0040764 A1* | 2/2011 | Duchon ............ G06Q 10/04 707/738 |
| 2011/0125770 A1 | 5/2011 | Battestini et al. |
| 2011/0137816 A1 | 6/2011 | Kornblum et al. |
| 2011/0196802 A1 | 8/2011 | Ellis et al. |
| 2011/0225048 A1 | 9/2011 | Nair |
| 2011/0307303 A1 | 12/2011 | Dutta et al. |
| 2012/0095931 A1 | 4/2012 | Gurion et al. |
| 2012/0158792 A1 | 6/2012 | MacLaurin et al. |
| 2012/0180135 A1 | 7/2012 | Hodges et al. |
| 2012/0197835 A1 | 8/2012 | Costa et al. |
| 2012/0226749 A1 | 9/2012 | Dale et al. |
| 2012/0246137 A1 | 9/2012 | Sallakonda et al. |
| 2013/0054598 A1* | 2/2013 | Caceres ............ G06F 17/30303 707/737 |
| 2013/0290206 A1 | 10/2013 | Desai et al. |
| 2013/0290207 A1 | 10/2013 | Bonmassar |
| 2013/0290208 A1 | 10/2013 | Bonmassar et al. |
| 2013/0325734 A1 | 12/2013 | Bixler et al. |
| 2014/0032435 A1 | 1/2014 | Desai |
| 2014/0122355 A1 | 5/2014 | Hardtke et al. |
| 2014/0143164 A1 | 5/2014 | Posse et al. |
| 2014/0207699 A1 | 7/2014 | Bonmassar et al. |
| 2015/0293997 A1 | 10/2015 | Smith et al. |
| 2015/0339785 A1 | 11/2015 | Bischke et al. |

OTHER PUBLICATIONS

Bullhorn Reach. "Recruit the Best Talent," http://www.bullhornreach.com. Copyright 2013. Accessed on Jun. 23, 2015. 2 pg.

GitHub. Gist is a simple way to share snippets and pastes with others. https://gist.github.com/. Copyright 2015. Accessed on Jun. 23, 2015. 1 pg.

Lee, R., "Job Change Notifier," http://jobchangenotifier.com/. Copyright 2015. Accessed on Jun. 23, 2015. 1 pg.

LinkedIn. Rapportive. https://rapportive.com/. Copyright 2014. Accessed on Jun. 23, 2015. 2 pg.

Xobni. "Xobni has joined Yahoo!," http://address.yahoo.com/xobni. 2013. Accessed on Jun. 23, 2015. 5 pg.

Yi, X., et al., (2007) "Matching Resumes and Jobs Based on Relevance Models," Proc. of the 30th Annual International ACM SIGIR Conference on Research and Development in Information Retrieval; pp. 809-810.

U.S. Appl. No. 14/814,210, filed Jul. 30, 2015, Bischke et al.

U.S. Appl. No. 13/910,018, filed Jun. 4, 2013, Bischke et al.

U.S. Appl. No. 13/910,029, Systems and Methods for Notification of Profile Activity Suggestive of Career Change Across Multiple Websites, filed Jun. 4, 2013.

Christen, Peter et al., "Efficient Entity Resolution with Adaptive and Interactive Training Data Selection", 2013 IEEE 13th International Conference on Data Mining, IEEE, Nov. 14, 2015 (6 pages).

International Search Report and Written Opinion for International Application No. PCT/US2016/068844 dated Apr. 4, 2017 (20 pages).

* cited by examiner

ENTITY RESOLUTION TECHNIQUES AND SYSTEMS

CROSS-REFERENCE TO RELATED APPLICATIONS

This disclosure contains subject matter related to the subject matter of U.S. application Ser. No. 13/910,054, titled "Systems and Methods for Accessing Third Party Data on Websites" and filed on Jun. 4, 2013, which is incorporated by reference herein to the maximum extent permitted by applicable law.

FIELD OF INVENTION

The present disclosure relates generally to techniques and systems for entity resolution (e.g., identifying the entity described by a data set, determining whether two or more data sets describe the same entity, etc.). Some embodiments relate specifically to systems and techniques for creating aggregate descriptions of respective entities based on multiple sources of data describing multiple entities.

BACKGROUND

The volume of data accessible via computer networks in 2015 has been estimated to exceed one trillion gigabytes. Portions of that data describe various entities, including people, organizations (e.g., governmental organizations, corporations, etc.), or other entities. For example, one or more websites and/or social media profiles (collectively, "profiles") accessible via the Internet can describe an entity.

To locate data describing an entity of interest, computer users can use a variety of software tools, including browsers and search engines. For example, people involved in the evaluation, hiring, and/or recruiting (collectively, "recruiters") of employees can attempt to locate data that describe a candidate for a job by searching for a profile of the candidate on a website or on a social media platform (e.g., LinkedIn, Facebook, Twitter, Google+, etc.). After locating a profile of the candidate, the recruiter can attempt to locate additional profiles of the candidate on other websites or social media platforms to acquire additional information about the candidate. For example, the recruiter can manually traverse links between profiles (e.g., by following a hyperlink from a LinkedIn profile to a Twitter profile), or create a search string using data from the candidate's profile and input the search string into a search engine. In this way, a recruiter can compile an aggregate description of the candidate from multiple data sources.

SUMMARY OF THE INVENTION

Since many entities can share the same name (or similar names) and the volume of descriptive data available via computer networks is so vast, it can be difficult to determine which entity is described by a data set. As used herein, "entity resolution" may include tasks related to determining whether a data set describes a particular entity (as opposed, for example, to a different entity with the same name or a similar name), determining whether two or more data sets refer to the same entity, determining whether two or more data sets refer to different entities, etc.

The inventors have recognized and appreciated that conventional entity resolution techniques can be cumbersome (e.g., some techniques require human operators to manually perform a significant portion of the entity resolution tasks) and/or inaccurate (e.g., some techniques are driven by unreliable heuristics that often fail to perform entity resolution correctly), particularly when data sets are incomplete or inconsistent, or when data sets include inaccurate data. Cumbersome and inaccurate entity resolution techniques make it difficult to efficiently compile an accurate description of an entity of interest.

The inventors have also recognized and appreciated that conventional entity resolution techniques can be inflexible. For example, some conventional entity resolution techniques do not allow the user to adjust the rate at which the entity resolution tool makes various types of errors. Allowing the user to adjust the tool's error rate can be helpful, because different applications of entity resolution techniques can be more or less tolerant of different types of entity resolution errors, including "false positive" entity resolution errors (e.g., erroneous determinations by the entity resolution tool that a particular data set describes a particular entity, or that two data sets describe the same entity).

Thus, there is a need for entity-resolution systems and techniques that are more accurate, more automated, and/or more flexible. The inventors have recognized and appreciated that the accuracy, automation, and/or flexibility of entity-resolution tools can be increased by using statistical inference techniques (e.g., Bayesian inference techniques) to perform entity resolution. The use of statistical inference techniques can improve the accuracy of entity resolution because the statistical inference techniques account for the actual probability distribution of the underlying data, rather than relying on ad hoc guidelines or rules of thumb to determine whether a data set describes a particular entity. The use of statistical inference techniques can also facilitate the automation of an entity resolution tool because statistical inference techniques can be more precise than conventional techniques, leading to fewer "close cases" meriting manual inspection by a human operator. The use of statistical inference techniques also facilitates the estimation of an entity resolution tool's rate of false positive entity resolution errors, which can facilitate tuning of the tool's performance and therefore enhance the tool's flexibility.

According to an aspect of the present disclosure, an entity-resolution method is provided. The method includes estimating a joint probability of occurrence of a plurality of values of a respective plurality of descriptors of an entity. The plurality of descriptor values are included in a first data set. The method further includes determining that the joint probability of occurrence of the plurality of descriptor values is less than a threshold probability, and identifying a second data set including the same plurality of values of the same respective plurality of descriptors. The method further includes determining, based at least in part on the joint probability of occurrence of the plurality of descriptor values being less than the threshold probability and on the first and second data sets including the same plurality of descriptor values, that the first and second data sets describe the same entity.

In some embodiments, the method further includes determining a probability of occurrence of a value of a descriptor included in the plurality of descriptor values. In some embodiments, determining the probability of occurrence of the descriptor value includes counting occurrences of the descriptor value in a population or in a sample of the population.

In some embodiments, the plurality of descriptors includes at least one descriptor selected from the group of descriptor types consisting of personal descriptors, educational descriptors, and professional descriptors. In some embodiments, the one or more descriptors include at least one descriptor of a profile of the entity. In some embodiments, the profile of the entity is a social media profile of the entity. In some embodiments, the method further includes using machine learning to select the one or more descriptors for inclusion in the plurality of descriptors.

In some embodiments, the plurality of descriptor values includes at least a first value of a first descriptor and a second value of a second descriptor, and estimating the joint probability of occurrence of the plurality of descriptor values includes multiplying a probability of occurrence of the first descriptor value and a probability of occurrence of the second descriptor value. In some embodiments, the first and second values of the first and second descriptors are not independent, and estimating the joint probability of occurrence of the plurality of descriptor values further includes multiplying a product of the probabilities of occurrence of the first and second descriptor values by a corrective factor.

In some embodiments, the method further includes changing the threshold probability based on a determination that an actual false positive entity resolution rate is lower or higher than a target false positive entity resolution rate. In some embodiments, the entity is a member of population of entities, and the method further includes setting the threshold probability based, at least in part, on a size of the population. In some embodiments, setting the threshold probability based, at least in part, on the size of the population includes setting the threshold probability to a value within one order of magnitude of the inverse of the size of the population.

In some embodiments, the second data set is derived from a resume and/or a social media profile. In some embodiments, the method further includes combining the first and second data sets, at least in part, based on the determination that the first and second data sets correspond to the same entity. In some embodiments, the first data set is included in a plurality of data sets corresponding to a respective plurality of entities, and the method further includes identifying one or more entities included in the plurality of entities as candidates for a job by searching the plurality of data sets for one or more respective data sets matching search criteria. In some embodiments, the search criteria include one or more qualifications for the job and one or more preferences of a recruiter. In some embodiments, the method further includes ranking the candidates and/or assigning the candidates to tiers.

According to another aspect of the present disclosure, a system is provided. The system includes at least one memory device storing computer-readable instructions, and at least one data processing device operable to execute the computer-readable instructions to perform operations. The operations include estimating a joint probability of occurrence of a plurality of values of a respective plurality of descriptors of an entity (the plurality of descriptor values being included in a first data set), determining that the joint probability of occurrence of the plurality of descriptor values is less than a threshold probability, identifying a second data set including the same plurality of values of the same respective plurality of descriptors, and determining, based at least in part on the joint probability of occurrence of the plurality of descriptor values being less than the threshold probability and on the first and second data sets including the same plurality of descriptor values, that the first and second data sets describe the same entity.

According to another aspect of the present disclosure, a computer-readable storage medium is provided. The storage medium has instructions stored thereon that, when executed by a data processing device, cause the data processing device to perform operations including estimating a joint probability of occurrence of a plurality of values of a respective plurality of descriptors of an entity (the plurality of descriptor values being included in a first data set), determining that the joint probability of occurrence of the plurality of descriptor values is less than a threshold probability, identifying a second data set including the same plurality of values of the same respective plurality of descriptors, and determining, based at least in part on the joint probability of occurrence of the plurality of descriptor values being less than the threshold probability and on the first and second data sets including the same plurality of descriptor values, that the first and second data sets describe the same entity.

The foregoing paragraphs are provided to assist the reader in understanding aspect(s) and/or advantage(s) of some embodiments of the invention. Such aspect(s) and/or advantage(s) may not be provided by all embodiments. Other aspects and advantages of the invention will become apparent from the following drawings, detailed description, and claims, all of which illustrate the principles of the invention, by way of example only.

BRIEF DESCRIPTION OF THE DRAWINGS

Certain advantages of some embodiments may be understood by referring to the following description taken in conjunction with the accompanying drawings. In the drawings, like reference characters generally refer to the same parts throughout the different views. Also, the drawings are not necessarily to scale, emphasis instead generally being placed upon illustrating principles of some embodiments of the invention.

DETAILED DESCRIPTION

Figure 1:
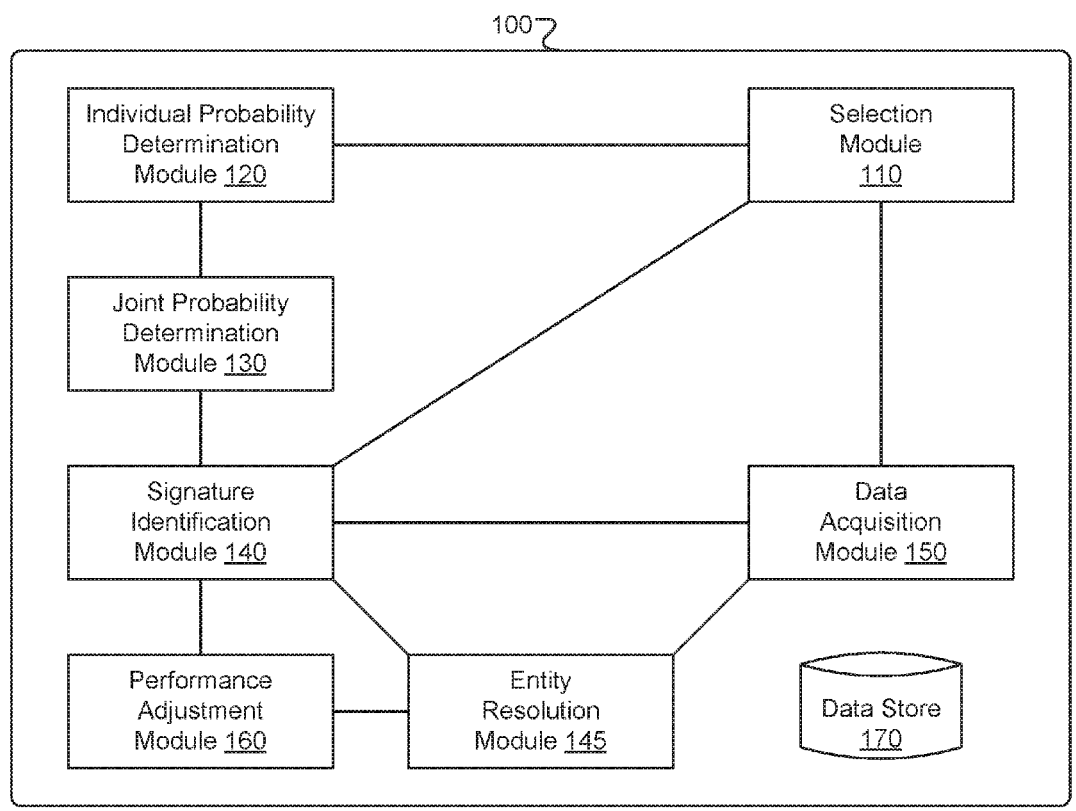
FIG. 1 is a block diagram of an entity resolution tool, according to some embodiments.

FIG. 1 shows an entity resolution tool 100, according to some embodiments. In some embodiments, the entity resolution tool 100 performs entity resolution tasks. For example, the entity resolution tool 100 can determine whether a data set (e.g., a data record) describes a particular entity (as opposed to a different entity with the same name or a similar name, for example), determine whether two or more data sets refer to the same entity, determine whether two or more data sets refer to different entities, etc.

To perform entity resolution tasks, the entity resolution tool 100 can operate on data sets (e.g., "data records"). In some embodiments, an individual data set corresponds to (e.g., describes) an entity. A data set can includes value(s) of one or more entity descriptors (e.g., data fields designating certain types of information that can describe entities), which may be organized according to a data model. The information in a data set can be derived from one or more suitable data sources including, but not limited to, structured, semi-structured, and/or unstructured data. Structured data can include the contents of databases (e.g., relational database records) and/or any other data organized according to a formal data model. Semi-structured data can include markup language data (e.g., XML data), other tagged data (e.g., JSON data), and/or any other suitable data organized using a self-describing structure. In some embodiments, structured and semi-structured data can identify values of entity descriptors. As just one example, structured or semi-structured data can indicate that a descriptor "First Name" has the value "William," which may indicate that the first name of an entity (e.g., person) is William.

Unstructured data can include the contents of web pages, the contents of social media profiles, the contents of electronic documents (e.g., resumes), and/or any other suitable data that are not organized according to a formal data model or self-describing structure. In some embodiments, when presented with unstructured data describing an entity, the entity resolution tool 100 converts the unstructured data into structured or semi-structured data and uses the converted data to perform other entity resolution tasks. For example, the entity resolution tool 100 can incorporate the converted data into a data set. In some embodiments, the entity resolution tool 100 can incorporate unstructured data into a data set (e.g., as unstructured text).

In some embodiments, the entity resolution tool 100 uses statistical inference techniques (e.g., Bayesian inference techniques) to perform entity resolution tasks. For example, given a group G of descriptor-value pairs that describe an entity E, the entity resolution tool can determine the probability that the same group of descriptor-value pairs also describes a different entity D. If the group of descriptor-value pairs is sufficiently improbable (meaning, in this example, that there is a sufficiently low probability that the group G of descriptor-value pairs describes a different entity D), the entity resolution tool 100 can determine that other data sets that include the same group G of descriptor-value pairs also describe the entity E. Alternatively, when the entity resolution tool 100 determine that other data sets that include the same group G of descriptor-value pairs, those data sets may be subjected to additional analysis to determine whether they describe the entity E. As just one example, the entity resolution tool 100 can determine that a data set including the following descriptor-value pairs describes the ninth President of the United States, William Henry Harrison, because the probability of an entity having this combination of descriptor-value pairs is sufficiently low (e.g., less than a threshold probability):

Descriptor="First Name"; Value="William",
Descriptor="Last Name"; Value="Harrison",
Descriptor="Place of Residence"; Value="Washington, D.C.", and
Descriptor="Occupation"; Value="Elected official".

In some embodiments, one or more performance parameters of the entity resolution tool 100 can be adjustable. For example, the entity resolution tool can permit adjustments to the tool's false positive entity resolution rate ("false positive rate"). False positive entity resolutions can include cases in which the entity resolution tool 100 erroneously determines that a data set describes a particular entity, or that two data sets describe the same entity, etc. As another example, the entity resolution tool can permit adjustments to the tool's false negative entity resolution rate ("false negative rate"). False negative entity resolutions can include cases in which the entity resolution tool erroneously determines that a data set does not describe a particular entity or that two or more data sets describe different entities, fails to determine that a data set describes a particular entity or that two or more data sets describe the same entity, etc.

The entity resolution tool 100 can include a selection module 110, an individual probability determination module 120, a joint probability determination module 130, a signature identification module 140, an entity resolution module 145, a data acquisition module 150, a performance adjustment module 160, and/or a data store 170. The selection module 110 can select a group of one or more entity descriptors for evaluation as a potential probabilistic signature of an entity. The individual probability determination module 120 can determine the probability that a specified entity descriptor has a specified value. The joint probability determination module 130 can determine the joint probability of two or more specified descriptors of the same entity having specified values. The signature identification module 140 can determine, based on the probability determination(s) made by the individual probability determination module 120 and/or the joint probability distribution model 130, whether a set of descriptor-value pairs satisfies specified conditions for functioning as a probabilistic signature of a corresponding entity. The entity resolution module 145 can determine, based on the probabilistic signature of an entity, whether a data set describes the entity. The data acquisition module 150 can acquire data for evaluation by the entity resolution tool, and/or convert the data into a common data model. The performance adjustment module 160 can adjust the performance (e.g., false positive rate, false negative rate, etc.) of the entity resolution tool 100. The data store 170 can store instructions for execution by a data processing device, and/or data on which the entity resolution tool 100 can operate to perform entity resolution tasks. Some embodiments of the modules 110-160 and the data store 170 are described in further detail below.

In some embodiments, the selection module 110 selects one or more entity descriptors for evaluation to determine whether the set of entity descriptors is a suitable probabilistic signature for an entity. For example, the selection module 100 can select two or more entity descriptors for analysis by the individual probability determination module 120, the joint probability module 130, and/or the signature identification module 140, to determine whether the joint probability of a specified entity's corresponding entity-descriptor value pairs is less than a threshold probability $P_{MAX}$ and/or greater than a threshold probability $P_{MIN}$.

In some embodiments, at least some of the descriptors available for selection by the selection module 110 describe attributes of the entity. The attributes of the entity can include personal attributes, educational attributes, professional attributes, etc. Examples of personal attributes include the entity's first name, last name, full name, age, date of creation (e.g., date of birth, date of incorporation, etc.), current location (e.g., place of residence, mailing address, street address, etc.), past location(s), current postal code, past postal code(s), language(s) spoken, interest(s), etc. Examples of educational attributes include the institution(s) of higher learning (e.g., college, university, professional school, etc.) attended by the entity, the entity's academic discipline (e.g., major, minor, etc.), the type(s) of degree(s) awarded to the entity by the institution (e.g., Bachelor of Arts, Bachelor of Science, Bachelor of Engineering, Master of Arts, Master of Science, Master of Engineering, Doctor of Philosophy, Juris Doctor, Doctor of Medicine, Doctor of Veterinary Medicine, etc.), the date(s) on which the degree(s) were awarded (e.g., the entity's date(s) of graduation), whether the entity pursued graduate-level studies at the institution, etc. Examples of professional attributes include the entity's industry, job title(s) (current and/or past), skills, employer(s) (current and/or past), responsibilities, publications, projects, etc.

In some embodiments, at least some of the descriptors available for selection by the selection module 110 describe attributes of computer-readable data associated with the entity (e.g., a web page, social media profile, or document that describes the entity and/or is controlled, operated, or distributed by the entity). Examples of computer-readable data associated with the entity include the entity's email address(es), social medial data (e.g., social media handle(s) (e.g., handles for LinkedIn, Facebook, Twitter, Google+, etc.), social media profile(s) (e.g., the contents of the entity's social media profile(s), the identifies of the social media platform(s) on which the entity has social media profile(s), etc.), date(s) on which social media profile(s) were updated, including but not limited to the most recent date(s) on which social medial profile(s) were updated), contacts (e.g., the entities identified by contact information in the entity's address book and/or included in the entity's social network(s)), metadata (e.g., digital key fingerprint), resume(s), etc. In some embodiments, computer-readable data associated with the entity can include link(s) to other computer-readable data (e.g., hyperlinks to other social media profile(s) of the entity), a summary description of the entity (e.g., a summary description provided in a resume or in a social media profile), keywords contained in a summary description of the entity, an image associated with the entity (e.g., an image provided in a social media profile), a value representing such an image (e.g., a hash of the image's digital encoding), etc.

Some examples of entity descriptors have been described, including descriptors that describe attributes of an entity and descriptors that describe attributes of data associated with an entity. Other descriptors are possible.

To select one or more descriptors for an entity resolution task, the selection module 110 can apply heuristics, machine learning, random selection, and/or any other suitable selection technique. The inventors have recognized and appreciated that, in many cases, an entity's (1) first name, (2) last name, and (3) location are sufficient for entity resolution, and in many other cases, an entity's (1) first name, (2) last name, (3) location and (4a) skill(s) or (4b) link(s) can be sufficient for entity resolution. In some embodiments, the selection module 110 implements heuristics based on these observations. For example, the selection module 110 can initially select an entity's first name, last name, and location for evaluation as a potential probabilistic signature for the entity, and if the entity resolution tool 100 determines that those descriptors do not represent a suitable probabilistic signature for the entity, the selection module 110 can then select an entity's first name, last name, location, and skill(s) (or link(s)).

In some embodiments, the selection module 110 uses machine learning to select one or more descriptor(s) for an entity resolution task. A machine learning tool can be trained, for example, to select one or more descriptor(s) for which the corresponding descriptor-value pair(s) are expected to have a specified joint probability (e.g., a joint probability less than an upper probability threshold $P_{MAX}$ and/or greater than a lower probability threshold $P_{MIN}$). One of ordinary skill in the art will appreciate that there are many techniques for training a machine learning tool to select descriptors. As just one example, a machine learning tool (e.g., a classifier) can be trained to assign descriptors to groups based on the expected joint probability of the descriptor-value pairs corresponding to the descriptors in the group. Such a machine learning tool can be trained based on observed estimates of the joint probabilities of combinations of the descriptor-value pairs (e.g., the inputs and outputs of the joint probability determination module 130). Optionally, the tool can also be trained based on the individual probabilities of the descriptor-value pairs (e.g., the inputs and outputs of the individual probability determination module 120). As another example, a machine learning tool can include a neural network, which can be trained to select one or more descriptor(s) for which the corresponding descriptor-value pair(s) are expected to have a specified joint probability. The neural network can be trained based on observed estimates of the individual probabilities of the descriptor-value pairs (e.g., the inputs and outputs of the individual probability determination module 120) and the joint probabilities of combinations of the descriptor value pairs (e.g., the inputs and outputs of the joint probability determination module 130).

In some embodiments, the selection module 110 randomly selects one or more descriptor(s) for an entity resolution task. Random selection can be useful, for example, during the training of the above-described machine learning selection tool, in cases where the number of available descriptors is relatively small, or in cases where a suitable machine learning selection tool and/or suitable selection heuristics are not available.

Some examples of selection techniques have been described, including techniques based on heuristics, techniques based on machine learning, and random selection techniques. Other selection techniques are possible.

In some embodiments, the individual probability determination module 120 determines the probability of a specified entity descriptor having a specified value. For example, the individual probability determination module 120 can determine the probability that the descriptor "First Name" has the value "William", or that the descriptor "Last Name" has the value "Harrison". The individual probability determination (IPD) module 120 can determine the probability of a descriptor-value pair using sampling techniques, exact estimation techniques, staged estimation techniques, and/or any other suitable probability-estimation techniques.

Examples of sampling techniques include counting techniques based on an entire data set (sampling technique "ST1"), counting techniques based on a subset of a data set (sampling technique "ST2"), search-based counting techniques (sampling technique "ST3"), etc. With sampling technique ST1, the IPD module 120 can estimate the probability of a descriptor-value pair by counting the number of occurrences of the descriptor-value pair in the data set, and dividing that number of occurrences by a number of records in the data set (e.g., all records in the data set, or all records in the data set that include the specified descriptor). The accuracy of a probability estimate generated using sampling technique ST1 can depend on the extent to which the data set accurately represents the population of interest.

With sampling technique ST2, the IPD module 120 can estimate the probability of a descriptor-value pair by counting the number of occurrences of the descriptor-value pair in a subset of the data set, and dividing that number of occurrences by a number of records in the data subset (e.g., all records in the data subset, or all records in the data subset that include the specified descriptor). The accuracy of a probability estimate generated using sampling technique ST2 can depend on the extent to which the data subset accurately represents the population of interest, which generally depends on the extent to which the data set accurately represents the population of interest and the manner in which the data subset is selected from the data set.

With sampling technique ST3, the IPD module 120 can estimate the probability of a descriptor-value pair by counting (within a data set) the number of occurrences of the specified value and related values for the specified descriptor, and dividing that number of occurrences by a number of records in the data set (e.g., all records in the data set, or all records in the data set that include the specified descriptor). For a specified value, "related values" can include values that are sometimes substituted for the specified value when describing an entity. For example, for the descriptor "First Name" and the value "William", related values can include "Will" and "Bill", because "Will" and "Bill" are common nicknames for people with the first name "William". The accuracy of a probability estimate generated using sampling technique ST3 can depend on the extent to which the data set (or subset) accurately represents the population of interest, and the extent to which the "related values" for a specified descriptor value are actually substituted for the specified value.

In some embodiments, the IPD module 120 can use sampling technique ST3 to control the range or precision of a proximity-based entity-resolution task. One of ordinary skill in the art can appreciate that different data sets can indicate an entity's location with varying degrees of precision. For example, some data sets can list the entity's full street address; other data sets can list only the entity's city, state, and postal code; other data sets can list only the entity's postal code or city/state; and still other data sets can list only the entity's region or state. When using the entity resolution tool 100 to identify records describing an entity based on the entity's first name, last name, and location, it can be advantageous to narrowly constrain the entity's location (e.g., to limit entity resolution to records that match the entity's full street address) or to loosely restrict the entity's location (e.g., to expand entity resolution to data sets that match postal codes within a specified proximity of the postal code that covers the entity's street address). By using sampling technique ST3 and controlling the "related values" that are used for the location descriptor, the entity resolution tool can adjust the precision and range of the location information used for entity resolution purposes.

In some embodiments, the IPD module 120 uses one or more of the above-described sampling techniques to estimate the probabilities of an entity's personal, educational, and/or professional attributes, including, without limitation, the personal, educational, and professional attributes described above.

In some embodiments, the IPD module 120 uses exact estimation techniques in cases where the space of possible values for a descriptor and the probabilities of those values are known. For example, the probability of an entity having a particular age or date of birth can be estimated based on government-maintained birth records or census records. As another example, the probability of an entity having a particular date of incorporation can be estimated based on government records of incorporation. As another example, the probability of an entity having a particular graduation date can be estimated based on records kept by institutions of higher learning. As another example, the probability of an entity having a particular social media handle or the probability of an entity's social media profile being updated on a particular date can be estimated based on data maintained by social media platform providers.

In some embodiments, the IPD module 120 uses staged estimation techniques in cases where the suitability of an estimation technique for a descriptor depends on the value of that descriptor or another descriptor. With a staged estimation technique, the IPD module can analyze the value of a descriptor-value pair and select a probability-estimation technique for that descriptor-value pair and/or for a different descriptor-value pair based on the analysis.

The inventors have recognized and appreciated that staged estimation techniques can improve the accuracy of entity resolution in cases where the entity has a name of foreign extraction. In some embodiments, the IPD module 120 determines that an entity has a name of foreign extraction if the entity's first or last name is characteristic of natives of a region (e.g., China, India, or Africa), and the entity is located in a different region (e.g., the United States or Western Europe). In cases where an entity does not have a name of foreign extraction, the probability distribution of the entity's first and last names may be independent. In cases where an entity has a name of foreign extraction, the entity's first and last names may not be independent, because an entity that has a first name of foreign extraction may be more likely to have a last name of foreign extraction (and vice versa). For example, a person located (e.g., residing) in the U.S. who has a first name of foreign extraction (e.g., a Chinese, Indian, or African name) may be more likely to have a last name of foreign extraction, relative to a person located in the U.S. who does not have a first name of foreign extraction.

In some embodiments, the IPD module 120 uses staged estimation techniques to account for the potential dependence of an entity's last name on the entity's first name (and vice versa). In some embodiments, when the selection module 110 selects the "First Name" descriptor and the "Last Name" descriptor for evaluation as a potential probabilistic signature, the entity resolution tool 100 can determine whether the value of the entity's first name or last name is of foreign extraction. If either name is of foreign extraction, the entity resolution tool can combine the "First Name" descriptor and the "Last Name" descriptor into a single "Full Name" descriptor, and the individual probability determination module 120 can estimate the probability of the entity's full name as the probability of the corresponding descriptor-value pair. In this way, the IPD module 120 can account for the dependence between the entity's first and last names, and other modules of the entity resolution tool 100 (e.g., the joint probability distribution module 130) can ignore that dependence.

However, some embodiments of the IPD module 120 do not use staged estimation techniques or any other techniques to account for the potential dependence between an entity's first and last names. In some embodiments, when the selection module 110 selects the "First Name" descriptor and the "Last Name" descriptor for an entity resolution task, the entity resolution tool 100 can determine the probabilities of the two corresponding descriptor-value pairs independently. In such cases, other modules of the entity resolution tool 100 (e.g., the joint probability distribution module 130) can account for any dependence between the entity's first and last names.

An example has been described in which the IPD module 120 applies staged estimation techniques to account for co-dependence of first and last names for entities having names of foreign extraction. In some embodiments, the IPD module 120 may use staged estimation techniques for other entity descriptors, including but not limited to other entity descriptors that are determined to have co-dependent probability distributions. As just one example, some social media platforms are used solely (or predominantly) by people who live in a particular country or region, or by people who work in a particular industry. Thus, there may be a dependence between the probability distribution of an entity's location or industry and the probability that the entity has an account with a location-specific or industry-specific social media platform.

The IPD module 120 can obtain the data used to estimate the probability of a descriptor-value pair from any suitable source. In some embodiments, the IPD module 120 applies sampling techniques to data sets stored in the data store 170 (e.g., a collection of data sets corresponding to entities that are candidates or potential candidates for employment). In some embodiments, the IPD module 120 applies sampling techniques to data sets provided by other computer systems. In some embodiments, the IPD module 120 estimates the probability of a descriptor-value pair dynamically, in response to the descriptor-value pair being provided as input to the IPD module 120. In some embodiments, the IPD module 120 estimates the probabilities of a group of descriptor-value pairs in advance and stores the estimated probabilities in the data store 170, such that the IPD module 120 can simply retrieve the estimate for a descriptor-value pair in response to the descriptor-value pair being provided as input to the IPD module 120, rather than estimating the probability again.

The joint probability determination module 130 can determine the joint probability of two or more descriptor-value pairs (e.g., the joint probability that two or more specified descriptors have specified values and describe the same entity). In some embodiments, the joint probability determination (JPD) module 130 estimates the joint probability of two or more descriptor-value pairs by multiplying the individual probabilities of the constituent descriptor-value pairs. One of ordinary skill in the art will appreciate that the joint probability $P_{XYZ}$ of two or more independent variables X, Y, ... Z having individual probabilities $P_X, P_Y, ... P_Z$ is the product of the individual probabilities, $P_X*P_Y* ... P_Z$.

In some embodiments, the JPD module 130 estimates the joint probability of two or more descriptor-value pairs by determining the product of the individual probabilities of the constituent descriptor-value pairs and a corrective factor. One of ordinary skill in the art will appreciate that in cases where the probability distributions of two or more descriptors are dependent, simply multiplying the individual probabilities of the corresponding descriptor-value pairs can produce a result that underestimates the joint probability of the descriptor-value pairs. Thus, multiplying the result by a corrective factor with a value greater than unity can reduce the magnitude of the error in the estimated joint probability.

The JPD module 130 can use any suitable technique to determine the corrective factor to be applied to the product of the individual probabilities of a group of descriptor-value pairs. In some embodiments, the corrective factor may be estimated based on the strength of the dependence between the probability distributions of the dependent descriptors.

The signature identification module 140 can determine whether a set of one or more descriptor-value pairs is a suitable probabilistic signature for an entity. In some embodiments, this determination is based on whether the joint probability of the descriptor-value pairs satisfies one or more specified conditions. For example, the signature identification module 140 can determine whether the probability of the set of descriptor-value pairs is less than an upper probability threshold $P_{MAX}$ and/or greater than a lower probability threshold $P_{MIN}$. One of ordinary skill in the art will appreciate that, for purposes of entity resolution, identifying a set of descriptor-value pairs having a probability that is neither too high nor too low can be advantageous for limiting the rate of false positive entity resolutions and the rate of false negative entity resolutions.

As described above, one application of the entity resolution tool 100 is to determine whether a data set describes a particular entity. In some embodiments, the entity resolution tool 100 identifies a set of descriptor-value pairs with a sufficiently low probability, selects that set of descriptor-value pairs as a probabilistic signature of data sets that describe the entity, and determines that a data set describes the entity if the data set includes that set of descriptor-value pairs. Thus, as the probability of a signature set of descriptor-value pairs decreases, the probability of two distinct entities E1 and E2 having data sets with that same signature set of descriptor-value pairs decreases, and the rate of false positive entity resolutions by the entity resolution tool 100 also decreases.

As just one example, there may be two entities named "William Harrison" living in Washington, D.C., one of whom is an elderly man and an elected official, and the other of whom is a young child with no profession. To distinguish data sets describing these two entities, some embodiments of the entity resolution tool 100 may select, as the signature for each entity, the entity's first name, last name, location, date of birth, and profession. In this example, the inclusion of the date of birth and profession descriptors in the signatures allows the entity resolution tool 100 to reliably distinguish data sets describing the two entities.

However, in cases where data sets are incomplete or include inaccurate descriptor-value pairs (with inaccurate values arising, for example, from typographical errors or out-of-date information), the rate of false negative entity resolutions by the entity resolution tool 100 can increase as the probability of the signature set of descriptor-value pairs decreases. Returning to the previous example, in which the signature for each of the "William Harrison" entities includes the entity's date of birth and profession (among other descriptors), some embodiments of the entity resolution tool 100 may be unable to determine whether a data set describes either of the "William Harrison" entities if the data set does not include values for the entity's first name, last name, location, date of birth, and profession, and may erroneously determine that a data set describes neither of the "William Harrison" entities if the values of any of those descriptors are inaccurate. Thus, as the probability of the signature set of descriptor-value pairs for an entity increases, the rate of false negative entity resolutions by the entity resolution tool may also decrease, particularly in cases involving partially incomplete and/or partially inaccurate data sets.

An example has been described in which a signature identification module 140 selects or rejects a set of descriptor-value pairs as a probabilistic signature for an entity based on whether the joint probability of the descriptor-value pairs is within a range defined by two thresholds, $P_{MAX}$ and $P_{MIN}$. In some embodiments, the signature identification module 140 selects or rejects a set of descriptor-value pairs based on whether the joint probability of the descriptor-value pairs is less than a single probability threshold. Other criteria can be used to determine whether a set of descriptor-value pairs is a suitable probabilistic signature.

In some embodiments, the selection module 110, individual probability determination module 120, joint probability module 130, and signature identification module 140 can iteratively select one or more descriptors, estimate the individual probabilities of an entity's corresponding descriptor-value pairs, estimate the joint probability of the descriptor-value pairs, and determine (e.g., based on the joint probability) whether the descriptor-value pairs are a suitable probabilistic signature. If so, the set of descriptor-value pairs may be selected as the probabilistic signature for the entity. If the tool determines that descriptor-value pairs are not a suitable signature for the entity, a new set of descriptor-value pairs can be selected and evaluated. Some embodiments of techniques for identifying a signature set of descriptor-value pairs for an entity are described below with reference to FIG. 2.

Returning to FIG. 1, the entity resolution module 145 can determine, based on the signature set of descriptor-value pairs for an entity, whether a data set describes the entity. In some embodiments, the entity resolution module 145 determines that a data set describes a particular entity if the data set contains all the descriptor-value pairs included in the entity's signature. In some embodiments, the entity resolution module 145 determines that a data set does not describe a particular entity if the data set contains at least one descriptor-value pair with a value that contradicts (e.g., differs from) the value of the corresponding descriptor-value pair included in the entity's signature. In some embodiments, the entity resolution module 145 refrains from determining whether the data set describes the entity if the data set neither contains all the descriptor-value pairs included in the entity's signature nor contains at least one descriptor-value pair that contradicts the signature's corresponding descriptor-value pair (e.g., in cases where at least one of the descriptor-value pairs is omitted from the data set, and the remaining descriptor-value pairs in the data set match the descriptor-value pairs in the signature).

For example, the signature identification module 140 may determine that the following set of descriptor-value pairs is a probabilistic signature for an entity: "First Name"="William", "Last Name"="Harrison", "Location"="Washington, D.C." Based on that signature, the entity resolution module 145 may evaluate the following three data sets to determine whether the data sets describe that entity. In some embodiments, the entity resolution module 145 may determine, based on the signature, that data set DS1 describes the entity, that data set DS2 does not describe the entity, and that there is insufficient information available to determine whether data set DS3 describes the entity.

Data set DS1: "First Name"="William", "Last Name"="Harrison", "Location"="Washington, D.C.", "Occupation"="Elected official";

Data set DS2: "First Name"="William", "Last Name"="Harrison", "Location"="New York, New York", "Occupation"="Elected official"; and Data set DS3: "First Name"="William", "Last Name"="Harrison".

The entity resolution module 145 can determine whether a data set describes an entity based on (1) whether the data set contains descriptor-value pairs matching the signature set of descriptor-value pairs for the entity, and/or (2) secondary information and analysis. Examples of secondary information and analysis that the entity resolution module 145 can use to determine whether a data set describes an entity include (1) whether the data set refers or links to another data set that describes the entity, (2) whether the data set contains an image that is strongly associated with entity, and/or (3) any other suitable information and analysis.

In some embodiments, the entity resolution module 145 uses secondary information or analysis to confirm, refute, or augment the entity resolution determination based on the entity's probabilistic signature. As an example of using secondary analysis for confirmation, the entity resolution module 145 can determine that a data set describes an entity if (1) the analysis of the data set based on the entity's probabilistic signature indicates that the data set describes the entity, and (2) at least one secondary analysis also indicates that the data set describes the entity. As an example of using secondary analysis for refutation, the entity resolution module 145 can determine that a data set describes an entity if (1) the analysis of the data set based on the entity's probabilistic signature indicates that the data set describes the entity, and (2) none of the secondary analyses indicate that the data set describes a different entity. Using secondary analysis to confirm or refute the results of the signature-based analysis can reduce the rate of false positive entity resolutions. Other uses of the secondary information or analysis are possible.

To determine whether a data set DS1 refers or links to another data set DS2 that describes a particular entity, the entity resolution module 145 can examine any content of the data set DS1 that identifies or links to other data sets (e.g., web pages or social media accounts). If data set DS1 identifies or links to, for example, a social media account, the entity resolution module 145 can determine whether the entity associated with that social media account has been identified (e.g., based on records of previous entity resolution determinations located in the data store 170). If so, the entity resolution module 145 can determine that the secondary analysis of references/links indicates that the data set DS1 describes the same entity. On the other hand, if the data set DS1 identifies or links to multiple social media accounts associated with different entities, the entity resolution module 145 can determine that the secondary analysis of references/links is inconclusive.

To determine whether an image in a data set DS1 is strongly associated with an entity, the entity resolution tool 100 can (1) determine whether the image matches (e.g., is identical or highly similar to) another image contained in a different data set DS2 that describes the entity, and (2) determine the individual probability of the image (e.g., based on the above-described sampling techniques). If the image matches another image in a data set DS2 that describes the entity and the probability of the image is low (e.g., less than a specified threshold), the entity resolution module 145 can determine that the secondary analysis of images indicates that the data set DS1 describes the entity. Otherwise, the entity resolution module 145 can determine that the secondary analysis of images is inconclusive. If that data set DS1 contains multiple images of low probability that match images in other data sets that describe different entities, the entity resolution module 145 can determine that the secondary analysis of images is inconclusive.

The entity resolution tool 100 can use any suitable technique to determine whether two images match. In some embodiments, the entity resolution tool calculates the perceptual hash (p-hash) of the images or the Hamming distance between the images and compares the result to a threshold to determine whether the images match.

In some embodiments, the entity resolution module 145 has (1) a fully-automated mode, in which the entity resolution module 145 automatically performs entity resolution tasks based on probabilistic signatures, secondary information/analysis, etc., and/or (2) a partially-automated mode, in which some entity resolution tasks are performed by a user of the entity resolution tool 100. In the partially-automated mode, the entity resolution module's determination as to whether a data set describes a particular entity (or whether two or more data sets describe the same entity) can be reviewed or overruled by the user. In some embodiments, the entity resolution module 145 requests the user's input regarding the tool's entity resolution determination if certain conditions are met (e.g., the joint probability of the entity's probabilistic signature is greater than a specified threshold or falls within a specified range, the secondary analysis refutes the signature-based analysis, the secondary analysis does not confirm the signature-based analysis, and/or any other suitable condition).

Returning to FIG. 1, the data acquisition module 150 can acquire data for evaluation by the entity resolution tool 100. In some embodiments, the data acquisition module 150 obtains data (e.g., structured, semi-structured, and/or unstructured data) by crawling the Internet. In some embodiments, a user of the entity resolution tool 100 can supply (e.g., upload) data to the data acquisition module 150. As described above, such data may include database records, tagged data, the contents of web pages/social media profiles/electronic documents (e.g., resumes), etc.

In some embodiments, the data acquisition module 150 converts acquired data into a common data model (e.g., a structured or semi-structured data model). For example, the data acquisition module 150 can convert the acquired data into data sets that encode descriptor-value pairs. In some embodiments, the data acquisition module 150 uses machine learning techniques to map fields of structured or semi-structured data to the corresponding descriptor-value pairs of the entity resolution tool's data model. In some embodiments, the data acquisition module 150 uses natural language processing (NLP) techniques to map the content of unstructured data to corresponding descriptor-value pairs. In some embodiments, a user of the entity resolution tool 100 may provide one or more data conversion templates, which the data acquisition module 150 can use to import data from corresponding structured or semi-structured data sources into the entity resolution tool's data model. For example, the entity resolution tool 100 can use a template to import data from a social networking platform into the entity resolution tool's data model.

In some cases, the data acquisition module 150 may fail to map at least a portion of the data from an acquired data set into the entity resolution tool's data model. Incomplete mapping of the data set may occur because portions of the data set do not correspond to any of the descriptors included in the entity resolution tool's data model, or because the entity resolution tool is unable to determine which descriptor(s) correspond to the unmapped portion of the data. Unmapped data may be discarded or stored for future use.

In some embodiments, the data sets that have been mapped to the entity resolution tool's data model can be stored in the data store 170. In some embodiments, the statistical sampling techniques described above with reference to the individual probability determination module 120 are performed on the data sets that have been mapped to the entity resolution tool's data model. In some embodiments, these data sets correspond to entities that are candidates or potential candidates for employment. In some embodiments, the entity resolution techniques described herein are performed on these data sets.

Returning to FIG. 1, the performance adjustment module 160 can adjust the performance (e.g., false positive rate, false negative rate, etc.) of the entity resolution tool 100. As described above, false positive entity resolution errors can arise when the entity resolution tool 100 erroneously determines that a particular data set describes a particular entity, that two data sets describe the same entity, etc. False negative entity resolution errors can arise when the entity resolution tool 100 fails to identify the entity described by a data set, fails to determine that two data sets describe the same entity, etc. As further described above, the false positive rate generally decreases as the joint probability of the descriptor-value pairs included in an entity's probabilistic signature decreases, and generally increases as the joint probability of the entity's probabilistic signature increases. The false negative rate generally increases as the joint probability of the entity's probabilistic signature decreases, and generally decreases as the joint probability of the entity's probabilistic signature increases.

The cost of a false positive or false negative error may depend on the context in which the error occurs. For example, if the entity resolution tool 100 is used by a recruiter to find information about a candidate for a job, the cost of a false positive error may be relatively low, because the recruiter's ability to identify appealing candidates is unlikely to be significantly affected by a few errors in the data describing the candidates. In other contexts, the cost of a false positive error may be much higher. Thus, the ability to estimate and adjust the false positive and/or false negative rates of the entity resolution tool 100 may enhance the tool's utility by making the tool flexible enough for use in a wide variety of contexts.

In some embodiments, the performance adjustment module 160 adjusts the entity resolution tool's false positive and/or false negative rates by adjusting one or more of the threshold probabilities ($P_{MIN}$, $P_{MAX}$) used by the signature identification module 140 to determine whether the joint probability of a set of descriptor-value pairs renders the set of descriptor-value pairs suitable for use as a probabilistic signature. In some embodiments, decreasing the upper threshold probability $P_{MAX}$ tends to reduce the false positive rate, and increasing the lower threshold probability $P_{MIN}$ tends to reduce the false negative rate.

In some embodiments, the performance adjustment module 160 estimates the entity resolution tool's false positive rate based on (1) the size of the population of entities to which the entity resolution tool 100 is being applied, and (2) the magnitude of the upper threshold probability $P_{MAX}$. In some embodiments, if the value of the upper probability threshold $P_{MAX}$ is within one order of magnitude of the inverse of the size of the population of entities, the performance adjustment module 160 may determine that the false positive entity resolution rate is between approximately 1% and 5% (e.g., approximately 3%). For example, if the entity resolution tool is applied to a population of 300,000,000 entities and the value of the upper probability threshold $P_{MAX}$ is between approximately $0.33e^{-8}$ and $0.33e^{-9}$, the performance adjustment module 160 may estimate that the false positive entity resolution rate is between approximately 1% and 5% (e.g., approximately 3%).

The entity resolution tool's ability to accurately estimate the false positive entity resolution rate based on the size of the entity population and the value of the probability threshold $P_{MAX}$ is a consequence of the entity resolution tool's use of statistical inference techniques to perform entity resolution tasks. The inventors are not aware of any conventional entity resolution tools that can accurately estimate the false positive entity resolution rate based on the size of the entity population and the value of a probability threshold.

In some embodiments, the performance adjustment module 160 adjusts the performance of the entity resolution tool 100 by adjusting the value(s) of the probability thresholds (e.g., $P_{MAX}$, $P_{MIN}$). In some embodiments, the performance adjustment module 160 iteratively adjusts the value of the threshold probability $P_{MAX}$ until the estimated false positive rate falls within a specified range or falls below a specified threshold. In some embodiments, the performance adjustment module 160 uses machine learning techniques to set the threshold probability $P_{MAX}$ to a value that is predicted to yield a false positive rate within a specified range or below a specified threshold. In some embodiments, the performance adjustment module 160 sets the entity resolution tool's false positive entity resolution rate to a value between approximately 1% and 5% (e.g., approximately 3%) by setting $P_{MAX}$ to a value within one order of magnitude of the inverse of the size of the population of entities to which the entity resolution tool is being applied. For example, for a population of 300,000,000 entities, the performance adjustment module 160 may set the entity resolution tool's false positive entity resolution rate to a value between approximately 1% and 5% (e.g., approximately 3%) by setting $P_{MAX}$ to a value between approximately $0.33e^{-8}$ and $0.33e^{-9}$.

Figure 2:
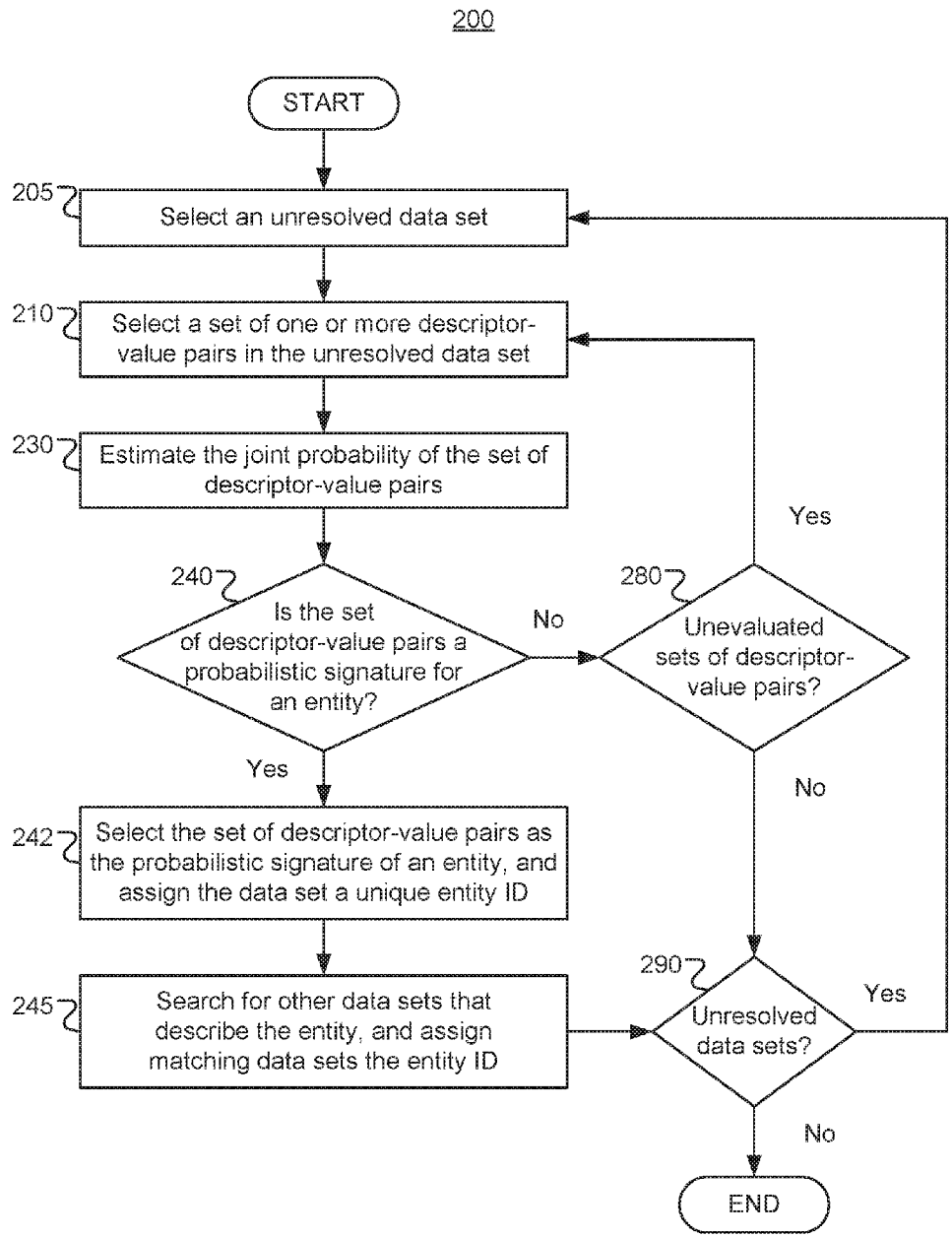
FIG. 2 is a flowchart of an entity resolution method, according to some embodiments.

FIG. 2 shows an entity resolution method 200, according to some embodiments. The entity resolution method 200 can be used to process a group of data sets to determine which data sets describe the same entity and which data sets describe different entities. At step 205, an "unresolved" data set (i.e., a data set for which the entity described by the data set has not been identified) is selected. At step 210, a set of one or more descriptor-value pairs contained in the unresolved data set is selected. At step 230, the joint probability of the set of descriptor-value pairs is estimated. At step 240, a determination is made as to whether the set of descriptor-value pairs is a suitable probabilistic signature for an entity. If so, at step 242, the set of descriptor-value pairs is selected as the probabilistic signature for an entity, and a unique identifier associated with the entity is assigned to the data set, indicating that the data set is a "resolved" data set (i.e., a data set for which the entity described by the data set has been identified). At step 245, a search is performed to identify other data sets that describe the entity, and the entity identifier is assigned to any data sets that are determined to describe the entity. The flow of control then proceeds to step 290. Returning to step 240, if the set of descriptor-value pairs is not a suitable probabilistic signature for an entity, a determination is made at step 280 as to whether the unresolved data set includes at least one set of descriptor-value pairs that has not yet been evaluated to determine its suitability for use as a probabilistic signature. If so, the flow of control returns to step 210, and an unevaluated set of descriptor-value pairs is selected. If not, the flow of control proceeds to step 290. At step 290, a determination is made as to whether any unresolved data sets remain. If so, the flow of control returns to step 205, and an unresolved data set is selected. If not, the entity resolution method 200 ends. Some embodiments of the steps of the entity resolution method 200 are described in further detail below.

At step 205, an unresolved data set is selected from a group of data sets. In some embodiments, the data sets are acquired by the entity resolution tool's data acquisition module 150, and/or stored in the entity resolution tool's data store 170. The unresolved data set can be selected based on any suitable criteria, including, without limitation, the size of the data set (e.g., the number of descriptor-value pairs contained in the data set), the amount of time that has passed since the data set was acquired or was most recently evaluated, whether the data set matches one or more search criteria, etc.

At step 210, a set of one or more descriptor-value pairs is selected from the unresolved data set. In some embodiments, the set of descriptor-value pairs is selected by the entity resolution tool's selection module 110. Some embodiments of techniques for selecting a set of descriptor-value pairs are described above.

At step 230, the joint probability of the selected set of descriptor-value pairs is estimated. In some embodiments, the joint probability of the descriptor-value pairs is estimated by the entity resolution tool's joint probability determination module 130 (e.g., using individual probabilities of the descriptor-value pairs as determined by the tool's individual probability determination module 120). Some embodiments of techniques for estimating the joint probability of a set of descriptor-value pairs are described above.

At step 240, a determination is made as to whether the selected set of descriptor-value pairs is a suitable probabilistic signature for an entity. In some embodiments, this determination is made by the entity resolution tool's signature identification module 140. Some embodiments of techniques for determining whether a set of descriptor-value pairs is a suitable probabilistic signature for an entity are described above.

If the selected set of descriptor-value pairs is determined to be a suitable probabilistic signature for an entity, at step 242, the set of descriptor-value pairs is selected as the probabilistic signature for the entity described by the data set, and an entity identifier ("entity ID") for that entity is assigned to the data set, indicating that the data set describes the entity corresponding to the entity ID. An entity's identifier can be, for example, a string of symbols, characters, and/or digits. In some embodiments, each entity ID is unique, in the sense that each entity ID differs from all other entity IDs. Unique entity IDs can be generated using any suitable technique.

At step 245, one or more data sets are analyzed to determine whether they describe the entity to which the entity ID is assigned. In some embodiments, the entity resolution tool's entity resolution module 145 determines whether the other data sets describe the entity. Some embodiments of techniques for determining whether a data set describes a particular entity are described above. In some embodiments, a data set is determined to describe an entity if the data set contains the probabilistic signature associated with the entity. After step 245, the flow of control may proceed to step 290.

In some embodiments, all the data sets analyzed at step 245 are unresolved data sets. In this case, no more than one entity ID will be assigned to any data set. In some embodiments, unresolved data sets and/or resolved data sets are analyzed at step 245. In this case, multiple entity IDs can be assigned to the same data set. The assignment of multiple entity IDs to a single data set may indicate that (1) multiple entity IDs actually refer to the same entity, or (2) a false positive entity resolution determination has been made.

In some embodiments, if (1) at least one data set contains a first probabilistic signature associated with a first entity and a second probabilistic signature associated with a second entity, and (2) all data sets that contain the first probabilistic signature either (a) also contain the second probabilistic signature or (b) do not contain sufficient data to determine whether the second probabilistic signature is or is not present, the determination can be made that the first and second entities are actually the same entity, and the entity IDs corresponding to the first and second entities can be replaced with a single entity ID. The probabilistic signature of the single, merged entity can be the probabilistic signature of the first entity, the probabilistic signature of the second entity, or a combination thereof.

On the other hand, if (1) at least one data set contains a first probabilistic signature associated with a first entity and a second probabilistic signature associated with a second entity, and (2) at least one other data set that contains the first probabilistic signature also contains data that are incompatible with the second probabilistic signature (or vice versa), the determination may be made that a false positive entity resolution has occurred. In this case, the first and second entities are different entities, and the probabilistic signatures of the two entities are not sufficient to distinguish the two entities. To address this problem, a less probable signature can be generated for the first entity (and/or for the second entity), and the data sets that had been associated with the first entity (and/or associated with the second entity) can be marked as unresolved and reevaluated using the new probabilistic signature(s) for the first entity and/or the second entity.

Returning to step 240, if the set of descriptor-value pairs is not a suitable probabilistic signature for an entity, a determination is made at step 280 as to whether the unresolved data set includes at least one set of descriptor-value pairs that has not yet been evaluated to determine its suitability for use as a probabilistic signature. If so, the flow of control may return to step 210, and an unevaluated set of descriptor-value pairs can be selected. If not, the flow of control may proceed to step 290.

At step 290, a determination is made as to whether any unresolved data sets remain. If so, the flow of control may return to step 205, and an unresolved data set may be selected. If not, the entity resolution method 200 ends.

Some embodiments of an entity resolution method 200 have been described. In some embodiments, an entity resolution method includes all the steps illustrated in FIG. 2. In some embodiments, an entity resolution method includes one or more (but not all) the steps illustrated in FIG. 2. For example, an entity resolution method can include one or more iterations of the inner loop comprising steps 210, 230, 240, and 280, or one or more iterations of the outer loop comprising steps 205, 210, 230, 240, 242, 245, and 290 (and, optionally, step 280). As another example, an entity resolution method can include any subset of the method steps illustrated in FIG. 2.

According to an aspect of the present disclosure, an entity resolution method may include estimating a joint probability of occurrence of a plurality of values of a respective plurality of descriptors of an entity. The plurality of descriptor values may be included in a first data set. The method may further include determining that the joint probability of occurrence of the plurality of descriptor values is less than a threshold probability, identifying a second data set including the same plurality of values of the same respective plurality of descriptors, and determining, based at least in part on the joint probability of occurrence of the plurality of descriptor values being less than the threshold probability and on the first and second data sets including the same plurality of descriptor values, that the first and second data sets describe the same entity.

Figure 3:
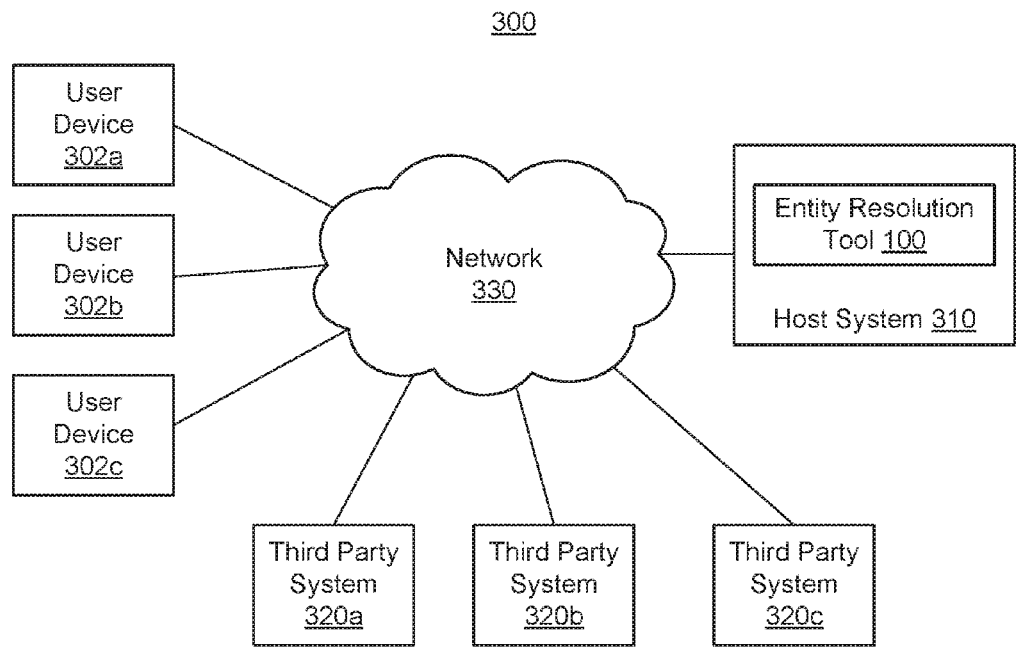
FIG. 3 is a block diagram of a system in which an entity resolution tool is used, according to some embodiments.

The entity resolution tool 100 can be used in any suitable system, for any suitable application. FIG. 3 shows an example of a system 300 for accessing third party data on web sites, in accordance with some embodiments. The data access system 300 includes one or more user devices 302, a host system 310, and one or more third party systems 320. The host system 310 includes an entity resolution tool 100. The user devices, host system, and/or third party systems can communicate with each other over a network 330. One or more users can interact with the data access system 300 via the user devices 302.

The user devices 302 can be network devices. Network devices can include computers (e.g., a personal computer, server computer, laptop computer, etc.); mobile devices (e.g., a tablet computer, personal digital assistants (PDAs) including but not limited to a Palm-based device or Windows CE device, etc.); phones (e.g., smartphones (e.g., iPhone, BlackBerry, Android, Treo, etc.), cellular phones, mobile phones, etc.); a wireless device (e.g., a wireless email device or other device capable of communicating wirelessly with a computer network or other communication network); or any other type of network device that can communicate over a network and process electronic transactions. One or more of the devices can be handheld devices. Any discussion herein of computers or mobile devices can also be applied to any other network devices.

The user devices 302 can be the same type of device and/or can include different types of devices. For example, the user devices 302 can be a computer 302a, a tablet 302b, and/or a smartphone 302c. Mobile devices can interact with the data access system 300.

The user devices 302 can communicate with the host system 310. In some embodiments, the host system 310 is implemented on a web server. In some embodiments, the host system 310 operates using one or more servers. A server can include a programmable processor capable of implementing one or more modules described herein and/or performing one or more steps described herein, and/or a memory including non-transitory computer-readable storage media capable of storing code, logic, or instructions for implementing one or more modules or performing one or more operations (e.g., method steps). In some embodiments, the host system 310 is provided on a single server or distributed over a plurality of servers. The host system 310 can be provided on a cloud computing infrastructure. In some embodiments, the host system 310 is implemented using a peer to peer structure. The host system 310 can be owned and/or operated by an entity that is the same as or different from the third parties described herein. The host system 310 can be operated on a different platform than the third party systems 320.

The users devices 302 and/or host system 310 can communicate with one or more third party systems 320. In some instances, the third party systems 310 are implemented on a web server. In some embodiments, the third party systems 310 operate using one or more servers. In some instances, the third party systems 320 are provided on a single server or be distributed over a plurality of servers. The third party systems 320 can be provided on a cloud computing infrastructure. In some instances, the third party systems 320 system is implemented using a peer to peer structure. The third party systems 320 can be owned and/or operated by entities that are the same as or different from the operator of the host system 310 described herein. Databases of different third parties can be separate from each other. In some embodiments, the third party systems 320 provide social media services and/or job placement services. The third party systems 320 can be capable of providing and/or displaying structured, semi-structured, and/or unstructured data including, but not limited to, database content, web pages, social media profiles, electronic documents (e.g., resumes), etc.

The communication between a network device 302, a host system 310, and/or third party systems 320 can be implemented, for example, using a connection between a client computer and a web server over a network 330. One or more servers can communicate with one or more computers or other network devices across a network. For example, a plurality of devices can communicate with a single server, or with a plurality of servers. The network, for example, can include a private network (e.g., a LAN), portions of the Internet or World Wide Web, or any other network that is capable of communicating data, including but not limited to wireless, cellular, or telecommunications networks. Each computer or other network device can connect to one or more web server over the network using data protocols (e.g., HTTP, HTTPS, etc.).

A user (e.g., a recruiter, employer, administrator, human resources manager, job candidate, customer, or any other party) can interact with a server, computer, mobile device, or other network device that is part of the data access system 300. When a computer or other network device is communicating with the data access system 300, the device can have a processor and a memory that can store an operating system (OS) and a browser application or other application to facilitate communications with the web server. For example, the operating system can operate to display a graphical user interface to the user and permit the user to execute other computer programs, for example, the browser application. The browser application (e.g., Microsoft Internet Explorer, Mozilla Firefox, etc.), when executed by the processor, permits the user to access data on the network 330, as is well known. Similarly, other applications or "apps" on mobile devices may be used. A server, computer, or other network device can have a display which displays a graphical user interface. Any display known in the art may be used including, but not limited to, a cathode ray tube, a liquid crystal display, a plasma screen, a touchscreen, an LED screen, an OLED display, etc.

The devices and/or servers can include one or more processors and/or memory. The processor(s) can be capable of executing one or more step of methods described herein or implementing one or more modules described herein. One or more steps can occur as dictated by one or more sets of rules. The rules can dictate when a user performs one or more steps, or when (or under what conditions) a machine automatically performs one or more steps. The processor can permit the automated management of data processing and data access without requiring human intervention at one or more steps. The devices and/or servers can have memory that can include non-transitory and/or tangible computer readable-storage media which can contain instructions, logic, data, or code that can be stored in persistent or temporary memory of the computer or other device, or can affect or initiate action by the computer or other device. Any of the steps described herein may be performed with aid of a programmable processor, which can act in accordance with non-transitory computer readable storage media as described herein. The memory can include one or more databases.

In some embodiments, the host system 310 aggregates data from various sources into data sets that describe entities who are candidates or potential candidates for employment. As described above, the third party systems 320 can provide structured, semi-structured, and/or unstructured data (e.g., database content, web pages, social media profiles, electronic documents (e.g., resumes), etc.). In some instances, different third party systems 320 provide one or more different social media profiles. Such social media profiles can be provided for the same entity. For example, an individual can have five different social media profiles via five different third party platforms. The third party platforms may or may not be related to employment or job experience. Some of the platforms can focus more or less than others on an entity's employment information. The third party systems can permit a user to search job postings and/or obtain (e.g., display or download) a candidate's resume or job qualifications. The third party systems can permit a user (e.g., candidate) to post personal information, educational information, employment information, or any other information describing the user for the purposes of seeking employment and/or other activities. The third party systems can permit a user (e.g., recruiter, prospective employers) to post job openings and criteria and/or search through candidate profiles. Examples of third party web sites can include but are not limited to Dribbble, Google+, Facebook, MySpace, Github, LinkedIn, Meetup, Quora, Stack Overflow and Twitter.

The third party systems can permit a user to connect with or link to another user using the same third party web site/social media platform or another third party web site/social media platform. For example, a user may be able to provide a link to the user's acquaintances or the user's social media profile. The social media profiles of the user's acquaintances may or may not be accessible and/or viewable via the link.

The third party systems can permit a user to connect with or link to another social media profile for the same user on the same third party web site/social media platform or another third party web site/social medial platform. For example, the user can link the user's Github account with the user's Facebook account. The social networking profiles of the user may or may not be accessible and/or viewable via the link.

In some embodiments, the host system 310 can create an aggregated data set that describes an entity. An entity's aggregated data set can be created based on information collected from the third party systems. For example, if the entity resolution tool 100 determines that a data set provided by a third party system describes an entity, information from that data set can be considered by the host system 310 for aggregation in the entity's aggregated data set. In some instances, the entity resolution tool 100 can determine that a plurality of third party systems have data sets (e.g., social media profiles) that describe the same entity. Information from each of those data sets can be considered by the host system 310 for aggregation in the entity's aggregated data set.

In some embodiments, the entity resolution tool 100 analyzes a data set provided by a third party system to determine whether the data set describes a particular entity. In some embodiments, a data set provided by a third party system describes an entity of interest, and the entity resolution tool analyzes other data sets to determine whether the other data sets describe the same entity.

The aggregated data set for an entity can include information from one or more of the data sets (e.g., social media profiles) provided by the third party systems. The host system 310 can assess the subject matter of the data sets (e.g., social media profiles) to determine whether to include that subject matter in the entity's aggregated data set. For example, if the host system 310 is configured to aggregate employment information, the data sets provided by the third party systems can be mined for employment information. In another example, if the host system 310 is configured to aggregate personal information, the data sets provided by the third party systems can be mined for personal information. Other information in the third party data set can be omitted from the aggregated data set for the entity. For example, if a data set includes information about an entity's pets or family, that information can, in some instances, be omitted from an aggregated data set focused on employment information.

In some instances, information contained in the data sets provided by the third party systems may or may not be duplicative. The host system 310 can assess such information so that duplicative information is not added to the entity's aggregated data set. In some embodiments, the host system 310 normalizes the information obtained from the third party data sets to provide consistently formatted data in the aggregated data sets. In some instances, the host system 310 determines ontological relationships between the information provided in different third party data sets, and uses the ontological information to determine whether the third party data sets contain the same underlying information and to consolidate duplicative information.

In some instances, the host system 310 stores an aggregated data set in the entity resolution tool's data store 170. Such information can be stored temporarily or can persist over time. The information can be linked to or associated with a user that initiated the creation of the aggregated data set. For example, the aggregated data set can be accessible by a third party prospective employer who viewed a social media profile of a job candidate and initiated the creation of the aggregated data set describing the candidate. In other instances, the aggregated data set is not stored persistently, but can be created and/or assembled on demand.

In some embodiments, recruiters can use the host system 310 to search for candidates or potential candidates for a job, optionally including entities who have not applied for or otherwise expressed interest in the job. In response to such a search query, the host system 310 can identify entities who meet specified criteria associated with the job or the recruiter, and provide the recruiter with aggregated data sets describing those entities. In some embodiments, the host system 310 searches only in the existing aggregated data sets. In some embodiments, the host system 310 searches in the data sets provided by the third party systems 320 and initiates data aggregation when a third party data set describing an entity that matches one or more of the criteria is identified.

In some embodiments, the host system 310 assigns the identified entities to tiers and/or ranks the identified entities, to assist the recruiter in determining which entities are likely to be most suitable for the job. In some embodiments, the host system 310 uses machine learning techniques to determine which entities are likely to be regarded as the most suitable candidates by particular recruiters and/or employers.

Further Description of Some Embodiments

Some embodiments have been described in which an entity resolution tool 100 uses an entity's (1) first name, (2) last name, and (3) location as a probabilistic signature for the entity. Other combinations of descriptors can function as probabilistic signatures for an entity. For example, the inventors have recognized and appreciated that, in some cases, an entity's (1) first name, (2) last name, and (3) contacts may be sufficient for entity resolution. The probabilistic techniques described herein can be used to determine whether the contacts contained in a data set being evaluated match the contacts contained another data set that is known to describe an entity.

Some embodiments of the tools (e.g., the entity resolution tool 100), modules (e.g., the modules 110-160), methods (e.g., the entity resolution method 200), and/or operations (e.g., the steps 205-290) described in the present disclosure can be implemented in digital electronic circuitry, or in computer software, firmware, or hardware, including any structures disclosed in this specification and their structural equivalents, or in combinations of one or more of them. Implementations of the subject matter described in this specification can be implemented as one or more computer programs, i.e., one or more modules of computer program instructions, encoded on a computer-readable storage medium for execution by, or to control the operation of, data processing apparatus. The entity resolution tool's data store 170 may store data on a computer-readable storage medium.

Alternatively or in addition, the program instructions can be encoded on an artificially-generated propagated signal, e.g., a machine-generated electrical, optical, or electromagnetic signal, that is generated to encode information for transmission to suitable receiver apparatus for execution by data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices). In some embodiments, the data store 170 of the entity resolution tool 100 is a computer-readable storage medium.

Some embodiments of the methods and operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Some embodiments of the processes and logic flows described in this specification can be performed by one or more programmable processors executing one or more computer programs to perform actions by operating on input data and generating output. Some embodiments of the processes and logic flows described herein can be performed by, and some embodiments of the apparatus described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both.

Figure 4:
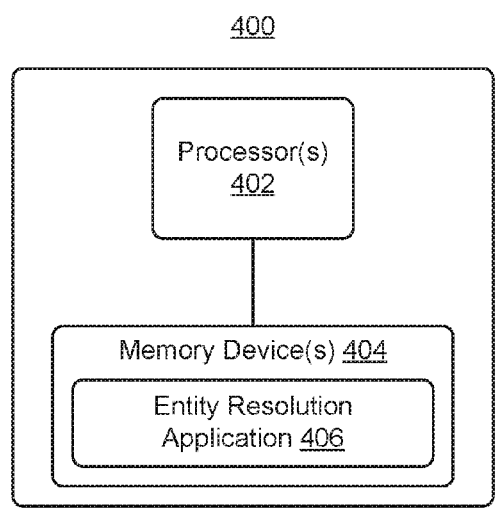
FIG. 4 is a block diagram of a computer, according to some embodiments.

FIG. 4 shows a block diagram of a computer 400. The elements of the computer 400 include one or more processors 402 for performing actions in accordance with instructions and one or more memory devices 404 for storing instructions and data. In some embodiments, the computer 400 executes an entity resolution application 406, which may implement an entity resolution tool 100 and/or perform an entity resolution method 200. Different versions of the entity resolution application 406 may be stored, distributed, or installed. Some versions of the software may implement only some embodiments of the tools and/or methods described herein. The entity resolution method 200 may be performed by multiple data processing apparatus.

Generally, a computer 400 will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display), for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Some embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

TERMINOLOGY

The phraseology and terminology used herein is for the purpose of description and should not be regarded as limiting.

As used herein, the term "can" should be understood to mean "may" or "may be capable of."

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

EQUIVALENTS

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method, comprising:
   performing, by at least one data processing device:
   (a) obtaining a plurality of data sets representing a respective plurality of entities;
   (b) selecting, from the data sets, a first data set representing a first entity, wherein the first data set includes a plurality of values of a respective plurality of descriptors of the first entity;
   (c) selecting two or more of the descriptors of the first entity, wherein the first data set includes respective values of the selected descriptors of the first entity;
   (d) for each of the selected descriptors, determining an individual probability that the value of the descriptor describes an entity in a particular population of entities;
   (e) estimating a joint probability that the values of the two or more selected descriptors of the first entity describe a second entity in the particular population of entities, different from the first entity, wherein the joint probability is estimated based, at least in part, on the individual probabilities;
   (f) determining whether the joint probability of the values of the selected descriptors is less than a threshold probability;
   (g) if the joint probability of the values of the selected descriptors is less than the threshold probability, searching in the plurality of data sets for a second data set including the values of the selected descriptors;
   (h) if the second data set is found, performing an entity resolution operation, wherein performing the entity resolution operation comprises determining, based at least in part on the joint probability of the values of the selected descriptors being less than the threshold probability and on the first and second data sets including the values of the selected descriptors, that the second data set describes the first entity; and repeating steps (b)-(h) one or more times, wherein a false positive rate of the entity resolution operation is determined based on a size of the population and on the threshold probability, and wherein estimating the joint probability that the values of all the selected descriptors describe a second entity in the particular population of entities comprises multiplying the individual probabilities of the values of the selected descriptors.

2. The method of claim 1, wherein determining the individual probability that the value of the descriptor describes an entity in the particular population of entities comprises counting occurrences of the descriptor value in a plurality of data sets representing entities in the population or in a sample of the population.

3. The method of claim 1, wherein the plurality of descriptors includes at least one descriptor selected from the group of descriptor types consisting of personal descriptors, educational descriptors, and professional descriptors.

4. The method of claim 1, wherein the plurality of descriptors includes at least one descriptor of a profile of the first entity.

5. The method of claim 4, wherein the profile of the first entity is a social media profile of the first entity.

6. The method of claim 1, wherein selecting the two or more descriptors comprises using machine learning to select the two or more descriptors.

7. The method of claim 1, wherein the selected descriptors include first and second descriptors, wherein the values of the first and second descriptors are not independent, and wherein estimating the joint probability further comprises multiplying a product of the individual probabilities of the values of the first and second descriptors by a corrective factor.

8. The method of claim 1, further comprising:

calculating the false positive rate of the entity resolution operation based on the size of the population and on the threshold probability; and determining whether the false positive rate of the entity resolution operation is lower or higher than a target false positive entity resolution rate, and if so, changing the threshold probability.

9. The method of claim 1, further comprising setting the threshold probability based, at least in part, on the size of the population.

10. The method of claim 9, wherein setting the threshold probability based, at least in part, on the size of the population comprises setting the threshold probability to a value within one order of magnitude of the inverse of the size of the population.

11. The method of claim 1, wherein the second data set is derived from a resume and/or a social media profile.

12. The method of claim 1, wherein performing the entity resolution operation further comprises combining the first and second data sets, at least in part.

13. The method of claim 12, further comprising: identifying one or more entities included in the plurality of entities as candidates for a job by searching the plurality of data sets for one or more respective data sets matching search criteria.

14. The method of claim 13, wherein the search criteria include one or more qualifications for the job and one or more preferences of a recruiter.

15. The method of claim 13, further comprising: ranking the candidates and/or assigning the candidates to tiers.

16. A system, comprising:

at least one memory device storing computer-readable instructions; and at least one data processing device operable to execute the computer-readable instructions to perform operations including:

(a) obtaining a plurality of data sets representing a respective plurality of entities;

(b) selecting, from the data sets, a first data set representing a first entity, wherein the first data set includes a plurality of values of a respective plurality of descriptors of the first entity;

(c) selecting two or more of the descriptors of the first entity, wherein the first data set includes respective values of the selected descriptors of the first entity;

(d) for each of the selected descriptors, determining an individual probability that the value of the descriptor describes an entity in a particular population of entities;

(e) estimating a joint probability that the values of the two or more selected descriptors of the first entity describe a second entity in the particular population of entities, different from the first entity, wherein the joint probability is estimated based, at least in part, on the individual probabilities;

(f) determining whether the joint probability of the values of the selected descriptors is less than a threshold probability;

(g) if the joint probability of the values of the selected descriptors is less than the threshold probability, searching in the plurality of data sets for a second data set including the values of the selected descriptors;

(h) if the second data set is found, performing an entity resolution operation, wherein performing the entity resolution operation comprises determining, based at least in part on the joint probability of the values of the selected descriptors being less than the threshold probability and on the first and second data sets including the values of the selected descriptors, that the second data set describes the first entity; and repeating steps (b)-(h) one or more times, wherein a false positive rate of the entity resolution operation is determined based on a size of the population and on the threshold probability, and wherein estimating the joint probability that the values of all the selected descriptors describe a second entity in the particular population of entities comprises multiplying the individual probabilities of the values of the selected descriptors.

17. The system of claim 16, wherein determining the individual probability that the value of the descriptor describes an entity in the particular population of entities comprises counting occurrences of the descriptor value in a plurality of data sets representing entities in the population or in a sample of the population.

18. The system of claim 16, wherein the selected descriptors include first and second descriptors, wherein the values of the first and second descriptors are not independent, and wherein estimating the joint probability further comprises multiplying a product of the individual probabilities of the values of the first and second descriptors by a corrective factor.

19. The system of claim 16, wherein the operations further include setting the threshold probability based, at least in part, on the size of the population.

20. The system of claim 19, wherein setting the threshold probability based, at least in part, on the size of the population comprises setting the threshold probability to a value within one order of magnitude of the inverse of the size of the population.

21. A computer-readable storage medium having instructions stored thereon that, when executed by a data processing device, cause the data processing device to perform operations comprising:
(a) obtaining a plurality of data sets representing a respective plurality of entities;
(b) selecting, from the data sets, a first data set representing a first entity, wherein the first data set includes a plurality of values of a respective plurality of descriptors of the first entity;
(c) selecting two or more of the descriptors of the first entity, wherein the first data set includes respective values of the selected descriptors of the first entity;
(d) for each of the selected descriptors, determining an individual probability that the value of the descriptor describes an entity in a particular population of entities;
(e) estimating a joint probability that the values of the two or more selected descriptors of the first entity describe a second entity in the particular population of entities, different from the first entity, wherein the joint probability is estimated based, at least in part, on the individual probabilities;
(f) determining whether the joint probability of the values of the selected descriptors is less than a threshold probability;
(g) if the joint probability of the values of the selected descriptors is less than the threshold probability, searching in the plurality of data sets for a second data set including the values of the selected descriptors;
(h) if the second data set is found, performing an entity resolution operation, wherein performing the entity resolution operation comprises determining, based at least in part on the joint probability of the values of the selected descriptors being less than the threshold probability and on the first and second data sets including the values of the selected descriptors, that the second data set describes the first entity; and
repeating steps (b)-(h) one or more times,
wherein a false positive rate of the entity resolution operation is determined based on a size of the population and on the threshold probability, and
wherein estimating the joint probability that the values of all the selected descriptors describe a second entity in the particular population of entities comprises multiplying the individual probabilities of the values of the selected descriptors.

22. The storage medium of claim 21, wherein determining the individual probability that the value of the descriptor describes an entity in the particular population of entities comprises counting occurrences of the descriptor value in a plurality of data sets representing entities in the population or in a sample of the population.

23. The storage medium of claim 21, wherein the selected descriptors include first and second descriptors, wherein the values of the first and second descriptors are not independent, and wherein estimating the joint probability further comprises multiplying a product of the individual probabilities of the values of the first and second descriptors by a corrective factor.

24. The storage medium of claim 21, wherein the operations further include setting the threshold probability based, at least in part, on the size of the population.

25. The storage medium of claim 24, wherein setting the threshold probability based, at least in part, on the size of the population comprises setting the threshold probability to a value within one order of magnitude of the inverse of the size of the population.

* * * * *